United States Patent
Marcel et al.

(10) Patent No.: US 9,170,466 B2
(45) Date of Patent: Oct. 27, 2015

(54) COMPLETELY SOLID ELECTROCHROMIC DEVICE, ELECTROCHROMIC BILAYER FOR SAID DEVICE, AND METHOD FOR PRODUCING SAID DEVICE

(75) Inventors: Corinne Marcel, Tours (FR); Frédéric Sabary, Tours (FR); Daniel Marteau, Tours (FR); Julien Demeaux, Thiville (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 13/993,260

(22) PCT Filed: Dec. 14, 2011

(86) PCT No.: PCT/EP2011/072722
§ 371 (c)(1),
(2), (4) Date: Sep. 13, 2013

(87) PCT Pub. No.: WO2012/080312
PCT Pub. Date: Jun. 21, 2012

(65) Prior Publication Data
US 2014/0002884 A1   Jan. 2, 2014

(30) Foreign Application Priority Data
Dec. 15, 2010   (FR) ..................... 10 60576

(51) Int. Cl.
*G02F 1/153* (2006.01)
*G02F 1/15* (2006.01)
*G02F 1/155* (2006.01)

(52) U.S. Cl.
CPC ............... *G02F 1/1523* (2013.01); *G02F 1/15* (2013.01); *G02F 1/155* (2013.01); *G02F 2001/1552* (2013.01); *G02F 2203/11* (2013.01)

(58) Field of Classification Search
CPC .................................. G02F 1/15; G02F 1/155
USPC ................... 359/265–275; 345/105; 428/701; 204/192.26
See application file for complete search history.

(56) References Cited

U.S. PATENT DOCUMENTS

| 6,798,554 B2 | 9/2004 | Hourquebie et al. |
| 7,265,890 B1 | 9/2007 | Demiryont |

(Continued)

FOREIGN PATENT DOCUMENTS

| FR | 2825481 A1 | 12/2002 |
| FR | 2879764 A1 | 6/2006 |

(Continued)

OTHER PUBLICATIONS

Sauvet, K., et al., "Electrochromic properties of WO3 as a single layer and in a full device: From the visible to the infrared", "Journal of Physics and Chemistry of Solids", Apr. 2010, pp. 696-699, vol. 71, No. 4.

(Continued)

*Primary Examiner* — Tuyen Tra
(74) *Attorney, Agent, or Firm* — Hultquist, PLLC; Mary B. Grant

(57) ABSTRACT

An all-solid electrochromic device with controlled infrared reflection or emission, in particular of electro-controllable type, comprising a stack successively comprising from a back face (3) as far as a front face (1) exposed to infrared radiation (2): a substrate (4) made of an electron-conducting material, or a substrate made of a non-electron-conducting material coated with a layer made of an electron-conducting material, forming a first electrode; a layer made of a first proton storage electrochromic material (5); a layer of a proton-conducting and electron-insulating electrolyte (6); a bilayer comprising a layer of a non-electrochromic, sub-stoichiometric tungsten oxide $WO_{3-y}$ forming a second electrode; said tungsten oxide $WO_{3-y}$ layer being arranged underneath a layer with variable infrared reflection of a second electrochromic material with variable proton intercalation rate, chosen from among crystallized tungsten oxide $H_xWO_3$-c and hydrated crystallized tungsten oxide $H_xWO_3.nH_2O$-c; a protective layer (10) transparent to infrared radiation.
Bilayer for this device.
Method for preparing this device.

38 Claims, 4 Drawing Sheets

(56) References Cited

U.S. PATENT DOCUMENTS

| | | |
|---|---|---|
| 7,722,986 B2 | 5/2010 | Lucas et al. |
| 7,894,120 B2 | 2/2011 | Valentin et al. |
| 8,102,587 B2 * | 1/2012 | Bressand et al. ............... 359/270 |

FOREIGN PATENT DOCUMENTS

| | | |
|---|---|---|
| FR | 2904704 A1 | 2/2008 |
| FR | 2934062 A1 | 1/2010 |
| WO | 2010058108 A1 | 5/2010 |

OTHER PUBLICATIONS

Antonaia, A., et al., "Improvement in electrochromic response for an amorphous/crystalline WO3 double layer", "Electrochimica Acta", 2001, pp. 2221-2227, vol. 46.

Bessiere, A., et al., "Control of Powder Microstructure for Improved Infrared Reflectance Modulation of an Electrochromic Plastic Device", "Chem. Mater.", 2003, pp. 2577-2583, vol. 15.

Franke, E., et al., "Infrared switching electrochromic devices based on tungsten oxide", "J. Appl. Phys.", Nov. 15, 2000, pp. 5777-5784, vol. 88, No. 10.

Lampert, C., "Electrochromic Materials and Devices for Energy Efficient Windows", "Solar Energy Materials", 1984, pp. 1-27, vol. 11.

Larsson, A., et al., "Infrared emittance modulation of all-thin-film electrochromic devices", May 10, 2004, pp. 2517-2520, vol. 58.

Lee, S., et al., "Electrochromic mechanism in a-WO3-y thin films", "Applied Physics Letters", Jan. 11, 1999, pp. 242-244, vol. 74, No. 2.

Orel, Z., et al., "Structural and electrochemical properties of CeO2 and mixed CeO2/SnO2 coatings", "Solar Energy Materials and Solar Cells", 1996, pp. 205-219, vol. 40.

Sauvet, K., et al., "Electrochromic properties of WO3 as a single layer and in a full device: From the visible to the infrared", "Journal of Physics and Chemistry of Solids", Apr. 2010, pp. 696-699 (Abstract), vol. 71, No. 4.

* cited by examiner

COMPLETELY SOLID ELECTROCHROMIC DEVICE, ELECTROCHROMIC BILAYER FOR SAID DEVICE, AND METHOD FOR PRODUCING SAID DEVICE

CROSS-REFERENCE TO RELATED APPLICATIONS

This application is a U.S. national phase under the provisions of 35 U.S.C. §371 of International Patent Application No. PCT/EP11/72722 filed Dec. 14, 2011, which in turn claims priority of French Patent Application No. 1060576 filed Dec. 15, 2010. The disclosures of such international patent application and French priority patent application are hereby incorporated herein by reference in their respective entireties, for all purposes.

TECHNICAL FIELD

The invention concerns an all-solid electrochromic device.

More specifically, the invention concerns an all-solid-state electrochromic device with controlled infrared reflection or emission, in particular of electro-controllable type.

The invention further pertains to a bilayer, also called a bilayer or composite electrode, for said electrochromic device.

Finally, the invention concerns a method for preparing said device.

The technical field of the invention can be defined as that of infrared-active electrochromic devices.

STATE OF THE PRIOR ART

There currently exist two families of infrared-active electrochromic devices, namely flexible devices which may be «all-organic» solely based on organic or hybrid polymers, and «all-solid» devices consisting of stacks of inorganic or mineral layers.

With respect to «all-organic» devices, document FR-A1-2 825 481 describes a flexible electrochromic structure operating by reflection at wavelengths of between 0.35 and 20 μm which comprises a polymer microporous membrane including a generally liquid electrolyte and, deposited on each of the surfaces of the microporous membrane and in this order: an electrode formed of a reflective electron-conducting layer e.g. made of gold, an electrochromic conductive polymer layer e.g. made of polyaniline, polythiophene or polypyrrole, and a flexible, transparent window.

The device described in this document has fragile interfaces which limit its lifetime. Since the electrolyte is generally liquid and if a break in the seal should occur, there may be leakage of electrolyte possibly leading to drying-up of the device.

Lack of electrolyte seriously deteriorates electrochromic properties.

Document WO-A1-2010/058108 describes an electro-emissive device comprising a material in the form of a semi-interpenetrated polymers network. This device has the advantage of not requiring a gold layer to operate.

Although having very good cycling at ambient temperature combined with a simplified architecture, this device also requires an impregnation step in a liquid electrolyte. In addition, tests conducted at high temperature reveal degradation of the electrochromic properties.

Hybrid devices are described in document FR-A1-2 879 764. This document relates to an aqueous, flexible electrochemical cell with controlled emission which inter alia comprises a porous active layer formed of a mixture of PVDF-HFP, of PEO and of a powder of an insertion material, and a porous counter-electrode formed of a mixture of PVDF-HFP, of PEO and of a powder of a compound comprising counter ions of the insertion ions.

The insertion material $WO_3.H_2O$ has good proton conduction combined with IR reflection modulation on an absorbent carbon background, is permeable to the ions and is collecting current.

Although more robust than the device of document FR-A1-2,825,481, this device, closely laminated with a gelled electrolyte, also requires encapsulation in a sealed IR-transparent window which complicates the design thereof.

Flexible devices, of whatever type, particularly have the disadvantage especially when used for thermal protection of satellites, of being scarcely adapted to conditions in space.

Gel electrolytes raise problems when used in a vacuum, and the constituent polymers of flexible devices become deformed under the effect of heat and have little UV resistance.

«All-solid», «controllable» devices are most often designed for glazing applications and allow visual comfort to be combined with heat comfort in the visible and near infrared (IR) region.

The active material generally consists of a porous tungsten oxide layer with low crystallization i.e. amorphous to X-rays.

This layer, called $H_xWO_3$-a layer, becomes absorbent when the material is intercalated, in other words when protons are inserted therein, namely when x>0.

One example of said «all-solid» device is described in document FR-A1-2 904 704 which concerns an electrochemical and/or electro-controllable device of glazing type and having variable optical and/or energy properties.

This device comprises an «all-solid» electrochromic stack of TC1/EC1/EL/EC2/TC2 structure with a carrier substrate provided with a first electron conducting layer TC1, a first electrochemically active layer EC1 capable of reversibly inserting ions such as cations like H+ or Li+ or anions like OH⁻, especially made of a cathodic or anodic electrochromic material respectively, an electrolyte layer EL, a second electrochemically active layer EC2 capable of reversibly inserting said ions, especially made of a cathodic or anodic electrochromic material respectively, and a second electron conducting layer TC2.

Each electroactive layer EC1 or EC2 may especially comprise tungsten oxide.

However, this all-solid device cannot be used for modulating mid-infrared radiation, namely of a wavelength generally from 1.5 to 20 μm, since the electrodes TC1 and TC2 are not transparent beyond 2 μm on account of their high conductivity.

Therefore particular problems arise for inorganic, «all-solid-state» electrochromic devices active in the infrared region.

Electrochromic devices of conventional design that are active in the infrared require an infrared-transparent electrode so that the signature of the active material can be efficient and adjustable, scalable.

For example, document U.S. Pat. No. 7,265,890 describes an electrochromic device which, on a rigid or flexible substrate, comprises: an electrode consisting, for example, of a metal film or of a conductive metallic oxide layer such as ITO, an electrochromic layer e.g. made of tungsten oxide loaded with lithium ions, an ion transfer layer made of lithium nitride, an electrolyte layer, an ion storage layer, and a transparent metal electrode.

In this device, the active material $Li_xWO_3$ is deposited at the back of the stack.

The performance of said device is therefore limited by the infrared transparency of the upper layers consisting of the electrolyte, the ion reservoir counter-electrode and the electrode in charge of providing current thereto.

The stacks that are infrared-active and in particular in the mid-infrared, namely a wavelength generally from 1.5 to 20 μm, may comprise a layer of tungsten oxide $H_xWO_3$-a on the front surface that is absorbent on a reflective background.

The document by K. Sauvet, L. Sauques and A. Rougier, Journal of Physics and Chemistry of Solids 71, (2010), 696-699 mentions the use of a porous, reflecting gold grid as electrode for $H_xWO_3$-a, similar to the architecture used in the « all-organic» flexible system of document FR-A1-2825481, in which the optical signature of the active material is disconnected from the remainder of the device.

However, for complete systems designed by these authors, the use of an infrared-transparent electrode, in addition to the micron-mesh gold wire grid, remains necessary to bring electrons into the active material.

However, infrared-transparent electrodes are still at the research stage and are difficult to produce industrially.

At the current time, recourse is made to IR-transparent gold grids with sub-millimetric mesh formed by photolithography on transparent glass of $BaF_2$ type, which drastically complicates the production of the devices.

Therefore, document FR-A1-2934062 relates to an electrochromic device with controlled infrared reflection, in particular of electro-controllable type which, between an IR-transparent carrier substrate and a counter-substrate, comprises a stack successively comprising:

a metal grid preferably made of gold, transparent in the infrared region, forming a first electrode;

a functional electrochromic system comprising a layer of a first ion storage electrochromic material (EC1) preferably made of iridium oxide, at least one electrolytic functional layer (EL1, EL2) preferably made of tantalum oxide and tungsten oxide, and a layer made of a second electrochromic material (EC2);

a metal layer capable of reflecting infrared radiation, forming a second electrode;

a lamination interlayer made of a thermoplastic material.

In the light of the foregoing, there is therefore a need for an infrared-active electrochromic device, preferably active in the mid-infrared, particularly having infrared (IR) emissivity modulation which makes it possible to overcome the use of electrodes transparent to infrared radiation and in particular of gold wire grids.

There is further a need, in the light of the foregoing, for an infrared-active electrochromic device, preferably active in the mid-infrared, that is robust, has high mechanical strength, can withstand high temperatures e.g. 100° C. or higher, is resistant to ultraviolet radiation and is able to be placed in an environment with prevailing vacuum e.g. in space.

There is also a need for a device which can be manufactured using a simple method, comprising a limited number of steps and of reduced duration.

The goal of the present invention is to provide an infrared-active electrochromic device, preferably active in the mid-infrared, which inter alio meets the above-listed needs.

It is a further goal of the invention to provide said device which does not have the shortcomings, limitations, defects and disadvantages of prior art devices and which solves the problems of prior art devices.

DISCLOSURE OF THE INVENTION

This goal and others are achieved according to the invention with an all-solid electrochromic device with controlled infrared reflection or emission, in particular of electro-controllable type, comprising a stack, said stack successively comprising from a back (rear) face towards a front face exposed to infrared radiation:

a) a substrate made of an electron-conducting material, or a substrate made of a non-electron-conducting material coated with a layer made of an electron-conducting material, said substrate made of an electron-conducting material or said layer made of an electron-conducting material forming a first electrode;

b) a layer made of a first, proton storage electrochromic material;

c) a proton-conducting and electron-insulating electrolyte layer;

d) a bilayer comprising a layer of a sub-stoichiometric, non-electrochromic tungsten oxide $WO_{3-y}$ where y is between 0.2 and 1, optically absorbent in the infrared (preferably the mid-infrared), electron-conducting, porous, forming a second electrode; said tungsten oxide layer $WO_{3-y}$ being arranged underneath a layer having variable reflection in the infrared of a second electrochromic material with variable proton intercalation rate chosen from among crystallized tungsten oxide $H_xWO_3$-c where x is between 0 and 1 and hydrated crystallized tungsten oxide $H_xWO_3 \cdot nH_2O$-c where x is between 0 and 1 and n is an integer from 1 to 2;

e) a protective layer, transparent to infrared radiation, made of an inorganic material.

The variable reflection layer which is part of the bilayer d) is more or less reflective or even not at all reflective depending on the value of x.

Therefore, for x=0 this layer is not reflective, and for values of x above 0.1 this layer becomes reflective.

Advantageously, said substrate when it is made of an electron-conducting material, may be made of a material chosen from among materials having mechanical and chemical resistance against stresses of the external medium (e.g. in space), and chemically compatible with proton functioning and in particular chemically compatible with the first proton storage electrochromic material, preferably said electron-conducting material is chosen from among metals such as aluminium, platinum or chromium and the alloys thereof.

By material « chemically compatible with protonic functioning, operation » is generally meant a material whose properties (chemical, physical, mechanical, electronic) are not degraded during operation of the device with protons.

By « chemically compatible with the first proton storage electrochromic material » is generally meant that the electron-conducting material does not or only scarcely reacts with the first proton storage electrochromic material or that the electron-conducting material is inert against the first proton storage electrochromic material.

In general, it is generally meant herein that a first material is chemical compatible with a second material when this first material does not or only scarcely reacts with the second material, or that the first material is inert against the second material.

Advantageously, said substrate when it is made of a non-electron-conducting material may be made of a material chosen from among materials having mechanical and chemical resistance to stresses of the external medium (e.g. in space) and chemically compatible with protonic operation, and in particular chemically compatible with the first proton storage electrochromic material, preferably said non-electron-conducting material is chosen from among glasses and organic polymers having mechanical and chemical strength such as Polyethylene Terephthalate or PET.

Advantageously the layer made of an electron-conducting material may be made of a material chosen from among materials having mechanical and chemical resistance to stresses of the external medium (e.g. in space) and chemically compatible with proton-operation and in particular chemically compatible with the first proton storage electrochromic material, preferably said electron-conducting material is chosen from among metals such as aluminium, platinum, chromium and alloys thereof; and electron-conducting metal oxides such as Indium Tin Oxide or ITO and Fluorine-doped Tin Oxide or FTO.

Advantageously, the first proton storage electrochromic material may be chosen from among proton storage electrochromic materials compatible with proton-operation, in particular chemically compatible with the proton-conducting and electron-insulating electrolyte, preferably the first proton storage electrochromic material may be chosen from among hydrated metal oxides, preferably amorphous, such as hydrated tungsten oxide $H_xWO_3.nH_2O$ where x is between 0 and 1 and n is an integer of 1 to 2, and mixtures of two or more of said oxides.

Advantageously, the proton-conducting and electron-insulating electrolyte may be chosen from among proton-conducting and electron-insulating electrolytes chemically compatible with proton-operation, in particular chemically compatible (inert) with/against crystallized tungsten oxide $H_xWO_3$-c (protonated tungsten oxide) or hydrated crystallized tungsten oxide $H_xWO_3.nH_2O$-c, preferably the proton-conducting and electron-insulating electrolyte may be chosen from among hydrated metal oxides, preferably amorphous such as amorphous hydrated tantalum oxide $Ta_2O_5$, amorphous hydrated zirconium oxide and mixtures of two or more of said oxides.

The electrolyte is hydrated and amorphous so that it can easily transport the protons of the storage material towards the active infrared-reflecting material. The metal oxide of the electrolyte must generally be different from tungsten oxide.

Advantageously, the protective layer transparent to infrared radiation may be made of a material chosen from among materials compatible with proton-operation, in particular chemically compatible with crystallized tungsten oxide $H_xWO_3$-c or hydrated crystallized tungsten oxide $H_xWO_3.nH_2O$-c, preferably the protective layer transparent to infrared radiation may be made of a material chosen from among non-toxic inorganic materials, preferably from among metal and metalloid oxides, preferably dense, such as cerium oxide $CeO_2$, yttrium oxide $Y_2O_3$, silica $SiO_2$ and mixtures of two or more of said metal or metalloid oxides.

By dense metal or metalloid oxides is generally meant that the density of these oxides is higher than 99% of the theoretical density.

Advantageously, the substrate (whether or not electron-conductive) has a thickness of 0.175 mm to 1 mm.

Advantageously, the layer made of electron-conducting material coating the substrate, if it is a substrate made of a non-electron-conducting material, has a thickness of 50 to 150 nm.

Advantageously the layer made of a first proton storage electrochromic material has a thickness of 0.2 to 1 µm, preferably from 0.4 to 1 µm.

Advantageously the proton-conducting and electron-insulating electrolyte layer has a thickness of 0.2 to 1 µm, preferably from 0.4 to 1 µm.

Advantageously, the tungsten oxide layer $WO_{3-y}$ has a thickness of 0.2 to 0.5 µm, preferably from 0.4 to 0.5 µm.

Advantageously, the layer of a second electrochromic material has a thickness of 0.2 to 1 µm, preferably 0.3 to 0.8 µm.

Advantageously, the protective layer transparent to infrared radiation has a thickness of 0.1 to 1 µm, preferably of 0.4 to 1 µm.

The device of the invention comprises a specific stack of specific layers in a specific order which has never been described in the prior art, such as represented in particular by documents relating to the «all-solid» electrochromic devices, mentioned above.

The device of the invention may be defined as an all-solid electrochromic device with infrared (IR) reflection or emission modulation, in particular in the mid-infrared (wavelengths of 1.5 to 20 µm) and notably in band II (wavelength 3 to 5 µm) and/or band III wavelength 8 to 12 µm) of the infrared spectrum, whose active part is a bilayer, which could also be called a composite or bilayer electrode, based on tungsten oxide which according to the invention is positioned on the front face of the device.

The preferred range of wavelengths of interest for the device of the invention lies in the mid-infrared (M-IR) i.e. in a range of wavelengths of 1.5 to 20 µm, in particular from 2 to 20 µm, which is a preferred range for spatial applications, whereas for glazing-type applications the wavelength ranges of interest lie in the Visible—Near Infrared.

The fact that the active part of the electrochromic device and in particular the layer of the second electrochromic material with variable proton intercalation rate, is positioned on the front face of the device i.e. on the side of the device directly exposed to infrared radiation, has never been described up until now for «all-solid state» devices and is the source of numerous advantages of the device of the invention.

This bilayer, this composite electrode, directly exposed to IR radiation is effectively capable, via reversible electrochemical insertion of protons (which were preferred to lithium ions for kinetic-related reasons), of modulating the total infrared emissivity of the system as is extensively demonstrated in the Examples given blow, independently of the other underlying constituents of the stack.

The active layer of the second electrochromic material, with variable proton intercalation rate, constitutes the first layer of the front face of the device. No obstacle, such as an electrode, therefore forms an obstacle against its exposure to infrared radiation, and no optical loss is created, since the tungsten oxide layer forming the second electrode is arranged on the face of the active layer of the second electrochromic material opposite the face exposed to infrared radiations.

In the device of the invention one of the major drawbacks of prior art «all-solid» devices in which the active layer is arranged underneath an electrode which must compulsorily be transparent to infrared radiation, with all the production difficulties that this entails, is overcome.

In particular, the device of the invention does not comprise any gold grid, which largely simplifies the fabrication of the device of the invention and greatly reduces the cost thereof.

More specifically, according to the invention and for the first time, an all-solid device is provided that is non-organic and does not contain any infrared-transparent electrode such as a gold grid.

In other words, the optical performances of the device of the invention are produced by the intrinsic electronic properties of the active electrochromic material positioned on the front face of the stack.

It is thus possible to benefit from the system's optimal optical response, independently of the layers located behind the front face.

It can be said that the device of the invention is of an optimized design which has never been either described or suggested in the prior art on « all-solid-state» devices.

Additionally, the device of the invention is characterized in that it comprises a bilayer which could also be called a composite or bilayer electrode, consisting of an active tungsten oxide layer that is electrochromic, reflective, crystallized and/or hydrated of formula $H_xWO_3$-c or $WO_3.nH_2O$ having a proton intercalation rate (defined by x) varying as a function of the applied voltage (terminals generally of between +3 and −3 Volts).

This active electrochromic layer according to the invention is itself deposited on an absorbent, sub-stoichiometric tungsten oxide layer of formula $WO_{3-y}$.

The bilayer alone produces an optical contrast which varies in the infrared, preferably in the mid-infrared (2 to 50 µm).

In the device of the invention, the technical effect produced by the different nature of the two layers constituting the bilayer is not an increase in the absorption of the device which is fixed by the $WO_{3-y}$ layer, but on the contrary the reduction thereof by increasing the reflection of the layer made of a second electrochromic material $H_xWO_3$-c or $WO_3.nH_2O$-c. This second electrochromic material is necessarily in the crystallized state so that an increase in the intercalation rate of ions x (here generally H+ protons) produces an increase in infrared reflection R in the layer of this second electrochromic material.

In other words, the layer of the second electrochromic material $H_xWO_3$-c or $WO_3.nH_2O$-c becomes reflective when intercalated, thereby increasing modulation of the emissivity of the device.

In this bilayer or composite electrode, the sub-layer of $WO_{3-y}$ which is a porous electrode plays a threefold role:
- it provides the system with an optical absorbing background;
- it allows the diffusing of protons;
- it ensures the supply of electrons in the active material $H_xWO_3$-c.

It can be said that the $WO_{3-y}$ sub-layer of the bilayer or composite electrode has a « 3-in-1» function which, for example, allows the use of a single tungsten target to obtain a simplified stack. Another material e.g. in the form of a gold grid is effectively not necessary to bring the electrons into the active material $H_xWO_3$-c or $WO_3.nH_2O$-c.

The $WO_{3-y}$ sub-layer is in sub-stoichiometric state, it is necessarily non-electrochromic and it is used as infrared-absorbing optical reference compared with an infrared-active upper layer. The $WO_{3-y}$ sub-layer is preferably absorbent in the mid-infrared.

The « all-solid» device of the invention is compatible with all the requirements governing use in space since its fully inorganic constituent materials enable it to withstand UV attack, vacuum and high temperature stresses e.g. close to 100° C., unlike existing flexible devices whose gel electrolytes ill-withstand vacuum draw and whose polymers deform under the effect of heat and have little UV resistance.

The device of the invention can be qualified as a robust, durable electrochromic device of simplified design.

The device of the invention additionally has the advantage of very simple manufacture using a limited number of steps and one same deposition method for all the layers.

The device of the invention can therefore be produced in shorter time and at reduced costs.

Therefore, the device of the invention may be entirely fabricated in a vacuum using one same Physical Vapour Deposition method (PVD) chosen for example from among cathode sputtering, laser ablation, or evaporation.

The invention further concerns a bilayer comprising a non-electrochromic, sub-stoichiometric tungsten oxide layer $WO_{3-y}$ where y is between 0.2 and 1, optically absorbent in the infrared (preferably the mid-infrared), electron-conducting, porous, forming an electrode; said $WO_{3-y}$ tungsten oxide layer being arranged underneath a layer having variable infrared reflection of a second electrochromic material with variable proton intercalation rate and chosen from among crystallized tungsten oxide $H_xWO_3$-c where x is between 0 and 1, and hydrated crystallized tungsten oxide $H_xWO_3.nH_2O$-c where x is between 0 and 1 and n is an integer of 1 to 2.

The advantages related to the structure and specific composition of this bilayer were mostly set forth above in the description of the device.

The invention also concerns a method for preparing the device of the invention, such as described above wherein the following successive steps are carried out:

a) a layer made of a first proton storage electrochromic material is deposited on a substrate made of an electron-conducting material, or on a layer made of an electron-conducting material arranged on a substrate made of a non-electron-conducting material, the said substrate made of an electron-conducting material or said layer made of an electron-conducting material forming a first electrode;

b) a layer of a proton-conducting and electron-insulating electrolyte is deposited on the layer made of a first proton storage electrochromic material;

c) a layer of a non-electrochromic, sub-stoichiometric tungsten oxide, $WO_{3-y}$, where y is between 0.2 and 1, optically absorbent in the infrared, electron-conducting, porous, forming a second electrode is deposited on the layer of a proton-conducting and electron-insulating electrolyte;

d) a layer with variable infrared reflection of a second electrochromic material with variable proton intercalation rate chosen from among crystallized tungsten oxide $H_xWO_3$-c where x is between 0 and 1 and hydrated crystallized tungsten oxide $H_xWO_3.nH_2O$-c where x is between 0 and 1 and n is an integer of 1 to 2, is deposited on the layer of a non-electrochromic, sub-stoichiometric tungsten oxide $WO_{3-y}$;

e) a protective layer, transparent to infrared radiation, made of an inorganic material, is deposited on the layer with variable infrared reflection of a second electrochromic material.

The method according to the invention is reliable and much simpler than prior art methods.

Advantageously, the layers are deposited using a Physical Vapour Deposition method, PVD, chosen from among cathode sputtering, laser ablation and evaporation.

Advantageously, all the layers are vacuum deposited using one same physical vapour phase deposition method, preferably by reactive magnetron cathode sputtering.

For technical-economic reasons, magnetron cathode sputtering in reactive mode is preferred since it ensures in particular good control over the oxygen level of the plasma, high deposition rates e.g. about 60 nm/min, good optical quality of the active material.

In addition, it allows preparation of the crystallized material $H_xWO_3$-c or $H_xWO_3.nH_2O$-c on the front face without heating the remainder of the stack.

Advantageously, all the steps are conducted in one same vacuum chamber without opening the chamber between each of the steps, which gives rise to major simplification of the method, major savings in time without proton loss and reduced costs.

The invention further concerns the use of the device such as described above for thermal protection of an object.

This object may in particular by a vehicle and in particular a space vehicle such as a satellite.

The use of the device of the invention is of particular advantage for vehicles such as satellites subjected to stresses, limitations on their on-board weight. The device of the invention is lightweight and provides major weight savings compared with the devices e.g. mechanical devices commonly used for thermal protection, to protect satellites in particular.

Other advantages of the invention will become more apparent on reading the following detailed description given in connection with the appended drawings.

The Y-axis gives the plotting of the coefficient of total reflection $R_T$ in the infrared range of the active part of the $H_xWO_3$-c (320 nm)/$WO_{3-y}$ (400 nm)/glass stack, and the X-axis indicates the wavelength λ (in μm) of the infrared radiation.

The curves A, B, C, D, E, F, G respectively correspond to x values of 0; 0.05; 0.1; 0.2; 0.25; 0.35 and 0.5.

Figure 4:
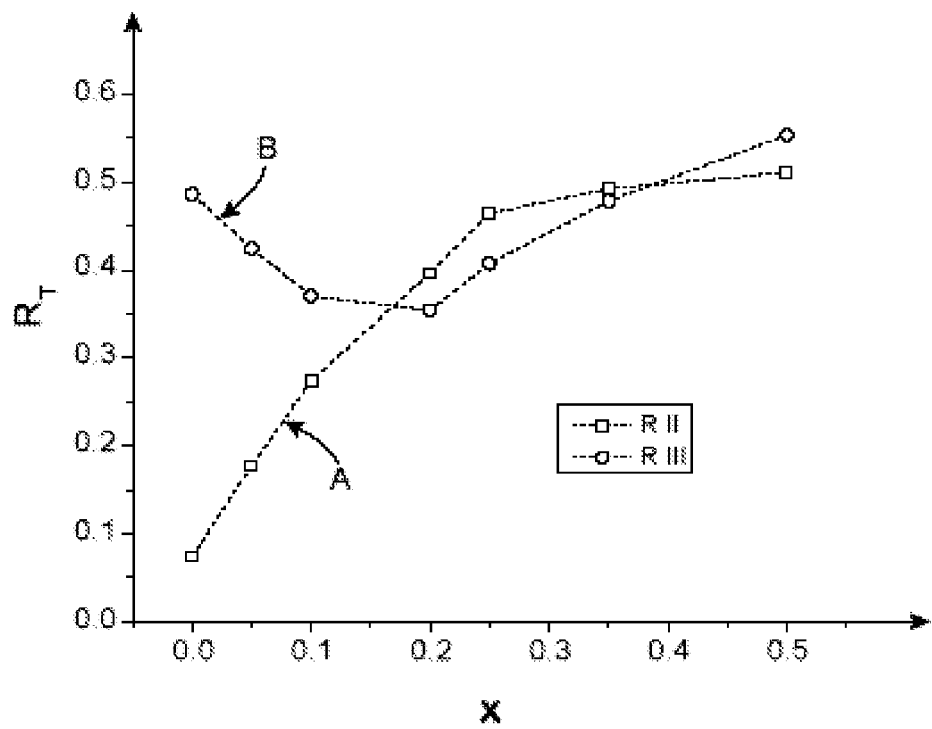

FIG. 4 is a graph giving the average of the total reflection coefficient $R_T$ produced by the active part of the $H_xWO_3$-c (320 nm)/$WO_{3-y}$ (400 nm)/glass stack in bands II (curve A) and III (curve B) as a function of the intercalation rate x in $H_xWO_3$-c.

Figure 5:
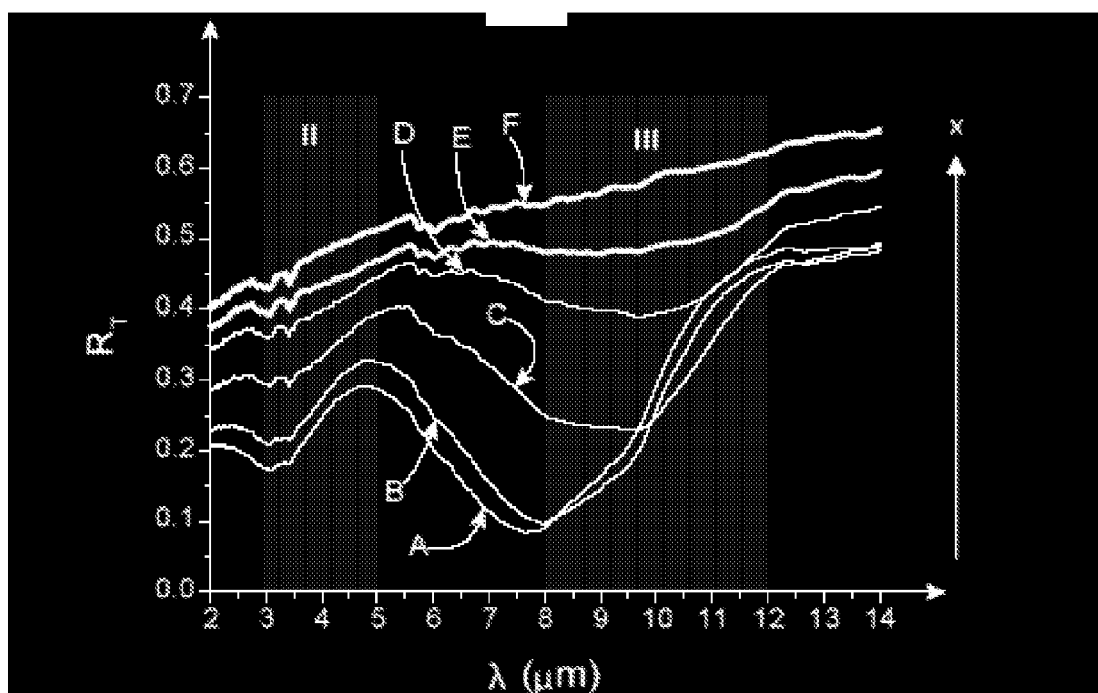

FIG. 5 is a graph illustrating the electrochemical monitoring of the active material $H_xWO_3$-c between 0.2 V (x=0) and −0.8 V (x=0.5) compared with a reference electrode of SCE type in 0.1 M $H_3PO_4$ medium.

The Y axis gives the plotting of the total reflection coefficient $R_T$ in the infrared region of the active part of the $H_xWO_3$-c (560 nm)/$WO_{3-y}$ (400 nm)/glass stack, and the X-axis indicates the wavelength λ (in μm) of the infrared radiation.

The curves A, B, C, D, E, F respectively correspond to x values of 0; 0.1; 0.2; 0.3; 0.4 and 0.5.

Figure 6:
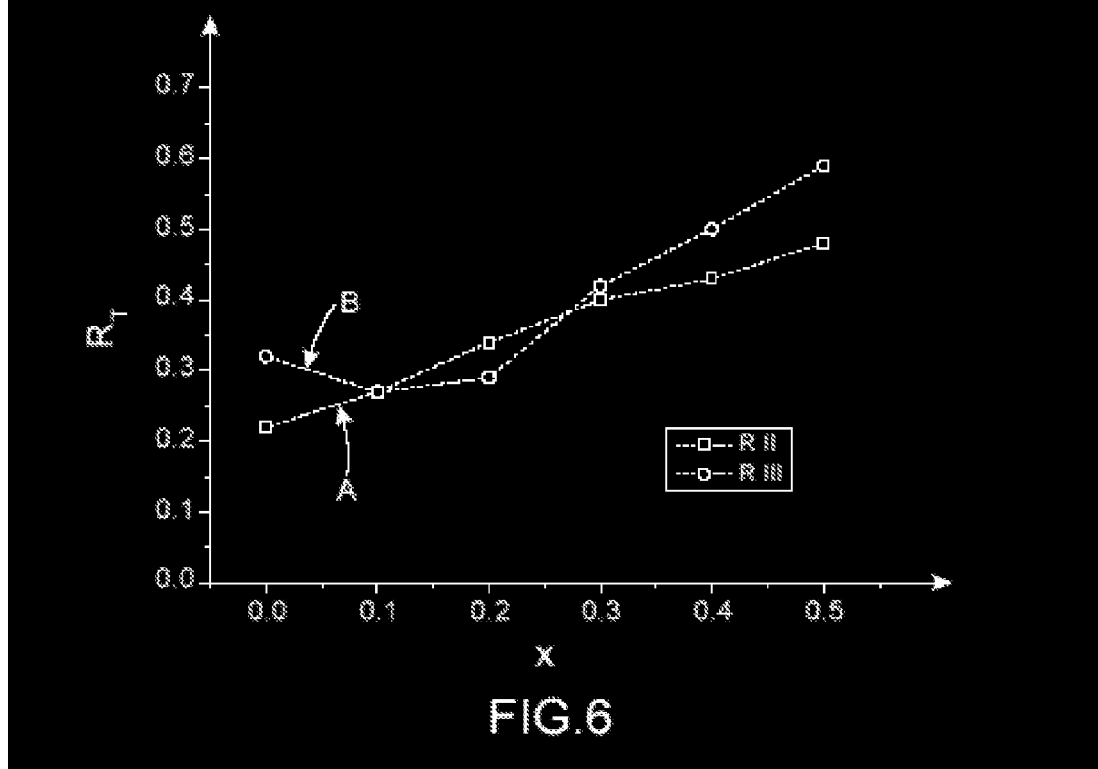

FIG. 6 is a graph giving the average of the total reflection coefficient $R_T$ produced by the active part of the $H_xWO_3$-c (560 nm)/$WO_{3-y}$ (400 nm)/glass stack in bands II (curve A) and III (curve B) as a function of the intercalation rate x in $H_xWO_3$-c.

Figure 7:
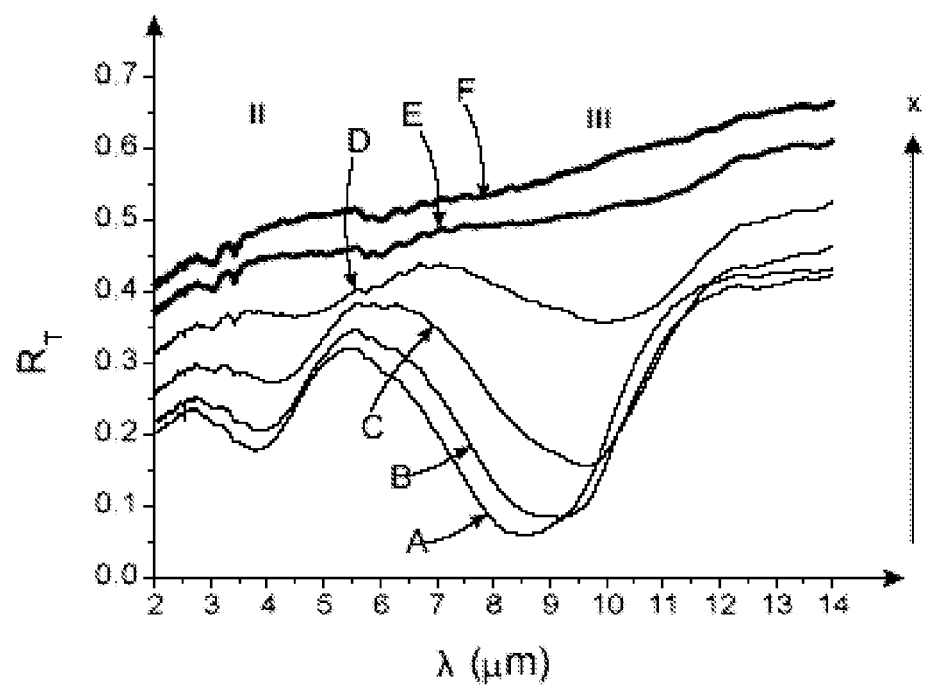

FIG. 7 is a graph illustrating the electrochemical monitoring of the active material $H_xWO_3$-c between 0.2 V (x=0) and −0.8 V (x=0.5) compared with a reference electrode of SCE type in 0.1 M $H_3PO_4$ medium.

The Y-axis gives the plotting of the total reflection coefficient $R_T$ in the infrared region of the active part of the $H_xWO_3$-c (730 nm)/$WO_{3-y}$ (400 nm)/glass stack and the X-axis indicates the wavelength λ (in μm) of the infrared radiation.

The curves A, B, C, D, E, F respectively correspond to x values of 0; 0.1; 0.2; 0.3; 0.4 and 0.5.

Figure 8:
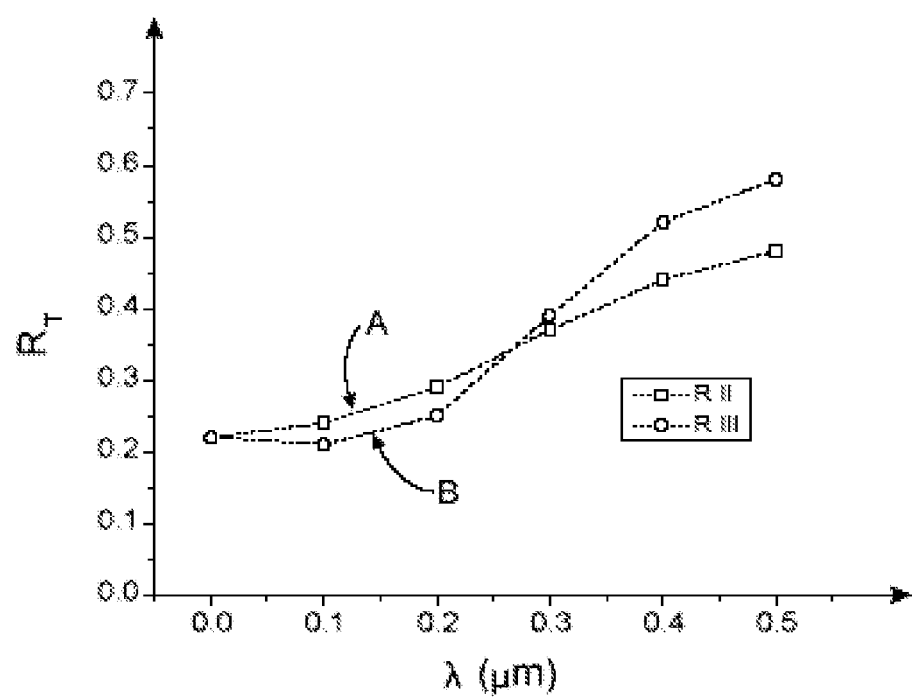

FIG. 8 is a graph giving the average of the total reflection coefficient $R_T$ produced by the active part of the $H_xWO_3$-c (730 nm)/$WO_{3-y}$ (400 nm)/glass stack in bands II (curve A) and III (curve B) as a function of the intercalation rate x in $H_xWO_3$-c.

DETAILED DESCRIPTION OF PARTICULAR EMBODIMENTS

Figure 1:
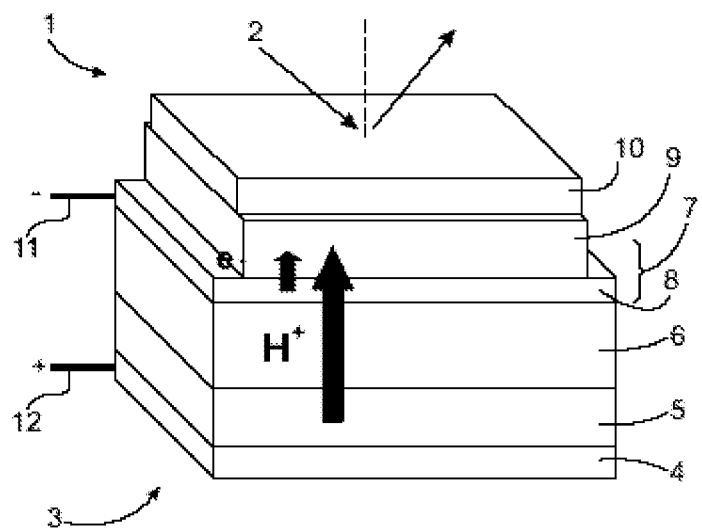
FIG. 1 is a schematic view of the device of the invention.

FIG. 1 shows a device of the invention comprising the specific bilayer of the invention.

This device comprises a front face 1 exposed to infrared radiation 2 and a back face 3 which is not directly exposed to infrared radiation.

The device of the invention first comprises a substrate or support 4 which essentially acts as metal support for the device.

The substrate or support 4 generally does not have infrared transparency.

The substrate or support is generally made of a lightweight material.

This substrate or support 4 may be made of a material chosen from among metals, glasses such as microscope slide glass, and organic polymers having sufficient rigidity such as poly(ethylene terephthalate) or PET.

The metals which may constitute the substrate or support 4 may be chosen for example from among aluminium, platinum, chromium and alloys thereof.

If the substrate or support 4 is made of a material which is not electron-conducting such as glass or PET, then a layer made of an electron-conducting material is deposited on the substrate or more exactly on the top surface thereof.

This layer made of an electron-conducting material acts as electrode connected to the power supply of the device.

This electron-conducting material is generally chosen from among electron-conducting metals and metal oxides.

Metals which may constitute the layer made of an electron-conducting material may be chosen from among the metals already cited above which may constitute the substrate or support.

Electron-conducting metal oxides are well known to the man skilled in the art.

Examples of such conductive oxides are Indium Tin Oxide or ITO, Fluorine-doped Tin Oxide $SnO_2$ or FTO.

The electron-conducting material of said layer, in particular if it is an electron-conducting metal oxide, is generally chosen from among those materials which can be deposited as a thin layer using a PVD method such as cathode sputtering, laser ablation or evaporation, and preferably from among materials which can be deposited as a thin layer by cathode sputtering.

If the substrate or support is made of a material which is electron-conducting such as a metal, then it is not necessary for a layer made of an electron-conducting material to be deposited on the substrate.

The support or substrate 4 which can then be qualified as a « single-piece» substrate in this case acts both as mechanical support for the device already indicated above and as electrode connected to the power supply of the device.

In FIG. 1 it is this embodiment without a layer made of an electron-conducting material on the substrate, which is illustrated.

It is important that the material which constitutes the layer made of an electron-conducting material if said layer is present, or the electron-conducting material which constitutes the substrate when said layer is not present, is chemically compatible with the material of the layer of a first proton storage electrochromic material 5 deposited on the substrate or on the layer made of an electron-conducting material.

The material which constitutes the layer made of an electron-conducting material, or the electron-conducting material which constitutes the substrate will therefore be chosen so that it is chemically compatible with a protonated medium such as a hydrated metal oxide.

The substrate 4 generally has a thickness of 0.175 to 1 mm.

The substrate 4 is generally in the form of a sheet of a lightweight material.

For example the thickness of the substrate 4 is generally about 1 mm for a glass substrate and about 175 μm for a substrate made of a polymer, e.g. a substrate made of PET.

The optional layer made of an electron-conducting material generally has a thickness of 50 to 150 nm.

On the substrate or the layer made of an electronic-conducting material there is arranged a layer made of a first proton storage electrochromic material 5. This layer may also be called a proton-reservoir counter electrode.

The first proton storage electrochromic material may be chosen from among all electrochromic hydrated metal oxides and the mixtures of two or more of these oxides.

Examples of such oxides are hydrated tungsten oxide $H_xWO_3.nH_2O$ where x is between 0 and 1 (0 and 1 inclusive) and n is an integer from 1 to 2, e.g. n=1.

The choice of this latter oxide similar to that of the bilayer has the advantage of further simplifying the method for preparing the device of the invention by reducing the number of targets, precursors used.

The first proton storage electrochromic material is generally chosen from among materials which can be deposited in a thin layer using a PVD method such as cathode sputtering, laser ablation or evaporation, and preferably from among materials which can be deposited in a thin layer by cathode sputtering.

The first proton storage electrochromic material is chosen so that it is chemically compatible with the proton-conducting electrolyte deposited on the layer of first electrochromic material.

The layer made of a first proton storage electrochromic material 5 generally has a thickness of 0.2 to 1 μm, preferably 0.4 to 1 μm.

On the layer made of a first proton storage electrochromic material 5 there is deposited a proton-conducting and electron-insulating electrolyte layer 6.

This proton-conducting electrolyte may be chosen from among all hydrated metal oxides, preferably amorphous, and mixtures of two or more of these oxides.

Indeed, amorphous oxides are much better proton conductors.

Examples of such oxides are amorphous, hydrated tantalum oxide $Ta_2O_5$ and amorphous, hydrated zirconium oxide.

The proton-conducting and electron-insulating electrolyte layer 6 generally has a thickness of 0.2 to 1 μm, preferably of 0.4 to 1 μm.

On the proton-conducting electrolyte layer 6 the bilayer is arranged which may also be called a bilayer electrode or composite electrode 7 according to the invention.

First, on the proton-conducting electrolyte layer, is arranged a tungsten oxide layer $WO_{3-y}$ with y between 0.2 and 1, that is sub-stoichiometric, non-electrochromic, optically absorbent in the infrared 8, forming a second electron-conducting electrode connected to the power supply of the device.

This tungsten oxide layer is chemically compatible with its surrounding materials, namely with the proton-conducting electrolyte of the underlying layer 6 and with the crystallized, optionally hydrated, tungsten oxide $H_xWO_3$-c or $H_xWO_3.nH_2O$-c of the layer immediately above 9 in the stack of layers of the device.

This layer 8 of a tungsten oxide $WO_{3-y}$ is generally a porous layer, of submicron pore size, e.g. from 10 to 100 nm.

The role of this layer 8 of tungsten oxide $WO_{3-y}$ is threefold.

This role is to provide the system with an optical absorbing background whilst allowing diffusion of the protons and supplying electrons in the active material $H_xWO_3$-c or $H_xWO_3.nH_2O$-c.

The layer 8 made of tungsten oxide $WO_{3-y}$ generally has a thickness of 0.2 to 0.5 μm, preferably from 0.4 to 0.5 μm.

The thickness of the layer 8 of tungsten oxide $WO_{3-y}$ must generally be 500 nm or less so that it is permeable to the protons. On the other hand, this thickness must generally be more than 200 nm to constitute an absorbent background making it possible to decouple the optical function of the front face of the device, essentially consisting of the bilayer 7, from the electrochemical function imparted by the remainder of the stack underneath the tungsten oxide $WO_{3-y}$ layer 8.

On the layer 8 of tungsten oxide $WO_{3-y}$ there is arranged a layer 9 made of a second electrochromic material chosen from among crystallized tungsten oxide $H_xWO_3$-c where x is between 0 and 1 and hydrated crystallized tungsten oxide $H_xWO_3.nH_2O$-c where x is between 0 and 1 and n is between 1 and 2.

This layer 9 made of a second electrochromic material is generally a porous layer of submicron porosity, e.g. from 10 to 100 nm.

This layer 9 made of a second electrochromic material has variable IR reflection.

In this layer, the active material is a crystallized tungsten oxide represented by the formula $H_xWO_3$-c which may be hydrated to improve the performance thereof, and essentially the proton conductivity thereof.

This hydrated crystallized tungsten oxide is represented by the formula $H_xWO_3.nH_2O$-c.

In these formulas x, which represents the intercalation rate of the active material $H_xWO_3$-c or $H_xWO_3.nH_2O$-c is variable and is generally comprised between 0 and 1 (0 and 1 inclusive) whilst n is generally comprised between 1 and 2 (1 and 2 inclusive).

The optical response of the device very closely follows the variations of x, with possible modulation to within 0.05, on account of the capacity of the inorganic layers to maintain their proton level also called the « memory effect».

In other words, the optical properties, the optical response of the active, electrochromic, reflective, crystallized and/or hydrated tungsten oxide layer 9 of formula $H_xWO_3$-c or $WO_3.nH_2O$-c can easily be modulated as a function of the proton intercalation rate (defined by x) which itself is variable as a function of the applied voltage.

Therefore, by modifying this voltage, it is possible to act at will on the optical properties of the device. For example, for an applied voltage of 0.2 V, x=0, and for an applied voltage of −0.8 V, x=0.5.

It is to be noted that the tungsten oxide $WO_3$ which constitutes the active part of the stack of the device according to the invention is a material capable of working with lithium ions and/or with protons.

According to the invention, it is chosen to cause the tungsten oxide $WO_3$ to function with protons rather than with Li+ ions for kinetic-related reasons.

Since « all-solid» devices such as the device of the invention are slower than flexible devices, it is preferable to work with a second protonic electrochromic material, with an inorganic proton electrolyte e.g. of hydrated tantalum oxide type Ta$_2$O$_5$, and finally with an inorganic counter-electrode that is also a proton counter-electrode.

The layer made of a second active electrochromic material 9 generally has a thickness of 0.2 to 1 µm, preferably of 0.3 to 0.8 µm.

The optical properties of the device are adaptable in the mid-infrared with the thickness of the active material H$_x$WO$_3$-c or H$_x$WO$_3$.nH$_2$O-c, in particular in bands II (3-5 µm) and III (8-12 µm) of transparency of the atmosphere.

For example, a narrow thickness (e.g. about 300 nm) of active material 9 will give in a privileged way, modulation of total reflection in band II, whilst a large thickness (e.g. about 700 to 800 nm) of active material will give in a privileged way, modulation of total reflection in band III.

To summarize, the optical properties, the optical contrast, of the device of the invention can be modulated in the infrared, in particular in the mid-infrared, by varying x and the thickness of the active material H$_x$WO$_3$-c or H$_x$WO$_3$.nH$_2$O-c.

On the layer made of a second active electrochromic material 9 there is arranged a layer 10 to protect the stack, transparent to infrared radiations and preferably having sun radiation reflection.

This layer 10 could also be called an encapsulation layer.

This layer 10 is effectively deposited during a final step on the stack assembly described above to maintain the ion content (protons) inside the device and thereby to act as encapsulating material.

By transparency to infrared radiations is generally meant that this layer 10 is transparent to infrared radiations of wavelengths comprised between 1.5 µm and 20 µm, preferably between 3 µm and 12 µm.

By low refractive index is generally meant that this layer 10 has a refractive index of between 1 and 2.

This layer 10 is generally made of a non-toxic inorganic material.

Preferably, this layer 10 is made of a material chosen from among metal and metalloid oxides, and mixtures of two or more of these metal oxides and metalloid oxides.

This or these, preferably amorphous, metal or metalloid oxides are preferably chosen from among oxides which can easily be deposited by PVD from an oxide or metal target such as cerium oxide CeO$_2$, yttrium oxide Y$_2$O$_3$, or SiO$_2$.

The stack protective layer 10 generally has a thickness of 0.1 to 1 µm, preferably from 0.4 to 1 µm.

The device of the invention further comprises means 11, 12 for setting up a variable voltage between the electrodes, for example a voltage varying between +3 Volts and −3 Volts.

The device of the invention is prepared following the above-described method.

The apparatus used to implement the method of the invention for preparing the device of the invention may be a frame for Physical Vapour Deposition (PVD) comprising:

a vacuum chamber having a volume of 0.1 m$^3$ for example, in which the initial prevailing pressure is about 5 10$^{-7}$ mbar for example, the maximum pumping rate to obtain the vacuum in the chamber being 900 L/s with a chamber initially filled with nitrogen;

no more than 6 cathodes having a diameter of 3 inches (or 76 mm), or else 2 cathodes having a diameter of 6 inches (or 152 mm) and 2 cathodes with a diameter of 3 inches (or 76 mm);

each deposit is performed by magnetron cathode sputtering from a metal target of Ir, Ta, W or Ce for example, with an applied power of 1 to 2 W/cm$^2$, preferably in pulsed DC mode, for example at 50 kHz for 2 is to obtain high depositing speeds, e.g. of 60 to 100 nm/minute for industrialization of the method qualified as reactive.

To oxidize and/or hydrate the materials in thin layers, the plasma gas consists of a mixture of argon (with hydrogen) and oxygen, injected into the chamber at flow rates respectively of 70 sccm and 9 to 20 sccm for example.

It is to be noted that according to one of the advantageous characteristics of the invention, the bilayer can be prepared using a PVD method e.g. by reactive magnetron cathode sputtering from a single target of tungsten, notably with a controlled oxygen content within the depositing chamber. In this case, in which only one tungsten target is used, a sub-stoichiometric oxide WO$_{3-y}$ is obtained.

The oxygen content of WO$_{3-y}$ determined by the value of y between 0.1 (namely for a flow rate of 9.9 sccm for example) and 0.5 (namely for a flow rate of 9 sccm for example) may be fully controlled by controlling the parameters of cathode sputtering, e.g.

power of 400 W applied to a tungsten target of 6-inches diameter;

cathode voltage of between 500 and 520 Volts;

high plasma-forming gas pressure of between 2 and 2.3 10$^{-2}$ mbar to obtain a porous layer.

The oxygen content of WO$_{3-y}$ may particularly be controlled by the level of oxygen in the depositing chamber whose flow rate is finely controlled, for example to within plus or minus 0.1 sccm, via optical regulation of the tungsten atoms level content in the depositing plasma. For this purpose, a photodiode is used provided with a 400 nm filter which is the wavelength of one of the main lines of W.

The crystallized active material H$_x$WO$_3$-c is obtained with an oxygen flow rate generally set at 20 sccm by the flowmeter.

The deposition parameters may be the following for example:

a power density applied to the tungsten target of 2 W/cm$^2$;

a cathode voltage of 520 Volts;

a plasma forming gas, e.g. a mixture of argon and oxygen, pressure of 2.5 10$^{-2}$ mbar.

In addition, the substrate is generally heated to 350° C., with a slight ion-assistance to improve crystallization during deposition.

This ion assistance may consist for example of bombardment by Ar$^+$ ions at 80 W in RF mode.

WO$_{3-y}$ may also be prepared by co-sputtering a metal tungsten W target and a second target of stoichiometric tungsten oxide WO$_3$.

The mixing proportion of the W and WO$_3$ materials is then adjusted by acting on the power density, in RF mode under argon, applied to their respective targets, between 1 and 2 W/cm$^2$ at low deposition speed, e.g. 10 to 20 nm/min, to obtain a homogeneous composition.

In this manner a matrix of stoichiometric WO$_3$ is obtained in which metal W atoms are implanted capable of percolating, with a W content generally of at least 10%.

This material can be qualified as a Cermet; it effectively has the characteristic properties of Cermets, in particular with a variation in conductivity typical of Cermets corresponding to the electronic percolation threshold (see Example 1).

It is to be noted that crystallized H$_x$WO$_3$-c may also be deposited with a WO$_3$ target in non-reactive RF mode under argon, but with a much slower deposition rate than with the reactive method using a metallic W target.

The deposition rate is generally about 12 nm/min in RF mode instead of about 60 nm/min in DC mode.

The inorganic, robust device of the invention of simplified design and which can operate in particular in the mid-infrared finds especially application in the thermal protection of satellites.

For example « patches » for satellites can be used, composed of several « all-solid » electrochromic devices according to the invention, to replace mechanical flaps which consume much energy.

The invention will now be described with reference to the following Examples given as non-limiting illustrations.

EXAMPLES

Example 1

This Example illustrates control over the electronic properties of the sub-layer made of $WO_{3-y}$, and in particular its resistivity by controlling the flow rate of oxygen into the chamber of the magnetron cathode sputtering frame during the depositing of this sub-layer.

This $WO_{3-y}$ sub-layer is a fundamental element of the device and of the bilayer (bilayer, composite electrode) according to the invention.

Depositing of $WO_{3-y}$ is preferably performed using the magnetron cathode sputtering technique in reactive pulsed DC mode using a physical vapour deposition (PVD) frame.

A power of 400 W is applied to a tungsten target of 6-inch diameter.

The voltage of the cathode is between 500 and 520 Volts, and the pressure of the plasma forming gas consisting of a mixture of argon and oxygen is between 2 and 2.3 $10^{-2}$ mbar.

This method advantageously produces porous thin layers, when a high working pressure is applied, and with rapid growth e.g. of about 100 nm/min.

Figure 2:
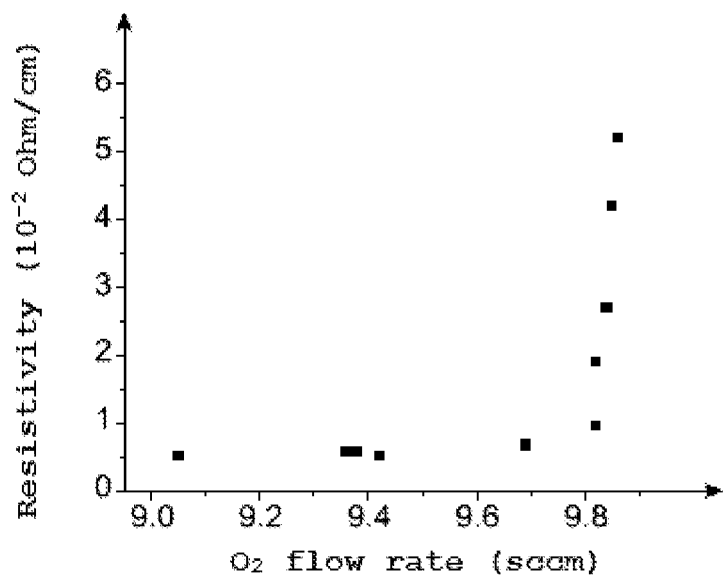
FIG. 2 is a graph representing the resistivity (in $10^{-2}$ Ohm·cm) of the $WO_{3-y}$ sub-layer as a function of the oxygen flow rate (in sccm) fed into the chamber of the magnetron cathode sputtering apparatus during the deposit of this layer using this technique.

FIG. 2 shows that the electronic properties of the $WO_{3-y}$ sub-layer can effectively be controlled by means of the flow rate of oxygen fed into the chamber of the frame during the deposition of this layer by magnetron cathode sputtering. In FIG. 2 it can be seen that the $WO_{3-y}$ material has a resistivity of between 0.5 and 5 $10^{-2}$ $\Omega \cdot cm$ when the flow rate of oxygen fed into the chamber regulated by optical emission of the tungsten atoms varies from 9.0 to 9.9 sccm (« standard cubic centimeter per minute ») with an argon flow rate of 70 sccm.

It is apparent that the electronic properties of $WO_{3-y}$ are highly sensitive to the flow rate of oxygen above a threshold value of 9.8 sccm.

FIG. 2 shows a transition threshold of electronic properties at 9.8 sccm (y=0.25) corresponding to maximum optical absorption (CERMET principle).

As a result, to ensure the reproducibility of the optical properties of the absorbent $WO_{3-y}$ sub-layer, use is made in following Example 2 of a thin layer of $WO_{3-y}$ (y=0.5) close to the optimal CERMET and prepared with 9 sccm of $O_2$.

Example 2

In this Example, it is shown that modulation of total reflection in the infrared range is effectively obtained on the front face of the « all-solid » device of the invention.

More specifically, it is illustrated in this Example that optical modulation in the infrared (focused in bands II and III of the IR region) is obtained in an aqueous liquid medium, namely a slightly acid electrolyte comprising 0.1 M $H_3PO_4$ with stacks consisting of a $H_xWO_3/WO_{3-y}$ bilayer on a glass substrate.

It is recalled that band II of the infrared range extends between the wavelengths of 3 and 5 μm, and that band III of the infrared range extends between wavelengths 8 and 12 μm.

Said stack which constitutes the « front face » of the device of the invention can be considered as representing the functioning of a proton « all-solid » device according to the invention since the layers located underneath the $WO_{3-y}$ layer do not or only scarcely contribute to the optical properties of the device of the invention.

As already specified above, in the stacks used in this example a thin layer of $WO_{3-y}$, close to the optimal CERMET, is used, and prepared with 9 sccm of $O_2$.

The thickness of the $WO_{3-y}$ material must be less than 500 nm so that it is permeable to the protons.

On the other hand, it must be thicker than 200 nm to form an absorbent background ($R_{surface}$<200 ohm/sq) thereby decoupling the optical function of the $H_xWO_3/WO_{3-y}$ front face from the electrochemical function imparted by the remainder of the stack.

In this Example, the thickness of the $WO_{3-y}$ layer (y=0.5) was therefore fixed at 400 nm.

The active $H_xWO_3$-c layer is deposited in the same magnetron cathode sputtering chamber as the $WO_{3-y}$ layer, without opening the chamber, using the same tungsten target with reactive pulsed DC deposition mode, characterized by heating and ion assistance to promote the crystallization of $WO_3$, and by a high working pressure namely a pressure P (Ar+$O_2$)=2.5 $10^{-2}$ mbar for example imparting sufficient porosity to the material for its reactivity with the intercalation of the protons (represented by the intercalation rate x in $H_xWO_3$).

In the initially deposited active layer x=0.

Three stacks with layers of $H_wWO_3$-c of respective thickness 320 nm, 560 nm and 730 nm on a layer of $WO_{3-y}$ (y=0.5) of 400 nm, on a glass substrate consisting of a microscope slide of 1 mm thickness, were examined.

Reversible modulation of total reflection optical response in the infrared was ensured by varying the intercalation rate x which corresponds to the level of protons in the active material $H_xWO_3$-c.

The value of x was caused to vary from 0 to 0.5.

a) Stack $H_xWO_3$-c (320 nm)/$WO_{3-y}$ (400 nm)/Glass.

Figure 3:
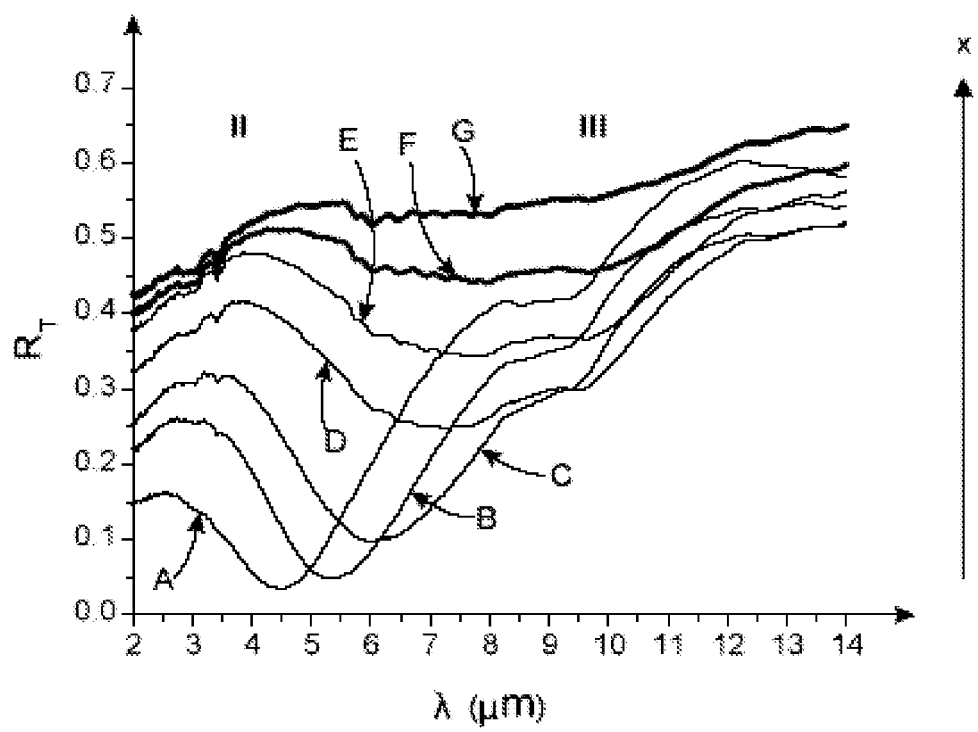
FIG. 3 is a graph illustrating electrochemical monitoring of the active material $H_xWO_3$-c, between 0.2 V (x=0) and −0.8 V (x=0.5) compared with a reference electrode of SCE type in 0.1 M $H_3PO_4$ medium.

With this stack, as can be seen in Table 1 and FIGS. 3 and 4, modulation of total reflection is obtained in a privileged way in band II on account of the narrow thickness of the layer of active material.

TABLE 1

| X | R (II) (*) | R (III) (*) |
|---|---|---|
| 0.50 | 0.51 | 0.55 |
| 0.35 | 0.49 | 0.48 |
| 0.25 | 0.46 | 0.41 |
| 0.20 | 0.40 | 0.35 |
| 0.10 | 0.27 | 0.37 |
| 0.05 | 0.18 | 0.42 |
| 0 | 0.07 | 0.49 |

(*) R(II) and R(III) respectively represent the average of the total reflection coefficients $R_T$ produced by the active part of the stack in bands (II) and (III) of the infrared range.

This stack, representing the device of the invention is very active in band II (ΔR II=51%-7% i.e. 44%) and almost inactive in band III (ΔR III=55%-49% i.e. 6%) when x varies from 0 to 0.5.

The global response times to obtain maximum contrast in band II are shorter than one minute for a surface area of 1 $cm^2$.

With a complete stack according to the invention, which would then comprise a solid electrolyte limiting kinetics, it could be thought that the global response times would be several minutes unless the range of variation of x values is reduced to 0.1 to 0.5 (since $H_xWO_3$-c is conductive irrespective of x) with attenuated optical contrast.

Therefore, by limiting modulation between 0 V (x=0.1) and −0.8 V (x=0.5), the contrasts become more balanced between bands II and III, i.e. ΔR II=24% and ΔR III=18% (see Table 1).

b) Stack of $H_xWO_3$-c (560 nm)/$WO_{3-y}$ (400 nm)/Glass

With this stack, as can be seen in Table 2 and FIGS. 5 and 6, a good compromise is obtained between modulation of total reflection in band II and modulation of total reflection in band III due to the intermediate thickness of the active material.

TABLE 2

| X | R (II) (*) | R (III) (*) |
|---|---|---|
| 0.5 | 0.48 | 0.59 |
| 0.4 | 0.43 | 0.50 |
| 0.3 | 0.40 | 0.42 |
| 0.2 | 0.34 | 0.29 |
| 0.1 | 0.27 | 0.27 |
| 0 | 0.22 | 0.32 |

(*) R(II) and R(III) respectively represent the average of the total reflection coefficients $R_T$ produced by the active part of the stack in bands (II) and (III) of the infrared region.

This stack, representing the device of the invention, is active in band II (ΔR II=26%) and in band III (ΔR III=27%) when x varies from 0 to 0.5.

c) Stack of $H_xWO_3$-c (730 nm)/$WO_{3-y}$ (400 nm)/Glass.

With this stack, as can be seen in Table 3 and FIGS. 7 and 8, modulation of total reflection is obtained in a privileged way in band III on account of the large thickness of the layer of active material.

TABLE 3

| X | R (II) (*) | R (III) (*) |
|---|---|---|
| 0.5 | 0.48 | 0.58 |
| 0.4 | 0.44 | 0.52 |
| 0.3 | 0.37 | 0.39 |
| 0.2 | 0.29 | 0.25 |
| 0.1 | 0.24 | 0.21 |
| 0 | 0.22 | 0.22 |

(*) R(II) and R(III) respectively represent the average of the total reflection coefficients $R_T$ produced by the active part of the stack in bands (II) and (III) of the infrared region.

This stack, representing the device of the invention, is active in band II (ΔR II=26%) and more active in band III (ΔR III=36%) when x varies from 0 to 0.5.

The invention claimed is:

1. An all-solid electrochromic device with controlled infrared reflection or emission comprising a stack, said stack successively comprising from a back face towards a front face exposed to infrared radiation:
   a) a substrate made of an electron-conducting material, or a substrate made of a non-electron-conducting material coated with a layer made of an electron-conducting material, said substrate made of an electron-conducting material or said layer made of an electron-conducting material forming a first electrode;
   b) a layer made of a first proton storage electrochromic material;
   c) a layer of a proton-conducting and electron-insulating electrolyte;
   d) a bilayer comprising a layer of a non-electrochromic, sub-stoichiometric tungsten oxide, $WO_{3-y}$, where y is comprised between 0.2 and 1, optically absorbent in the infrared, electron-conducting, porous, forming a second electrode; said layer of tungsten oxide $WO_{3-y}$ being arranged underneath a layer with variable infrared reflection, of a second electrochromic material with variable proton intercalation rate, chosen from among crystallized tungsten oxide $H_xWO_3$-c where x is comprised between 0 and 1, and hydrated crystallized tungsten oxide $H_xWO_3.nH_2O$-c where x is comprised between 0 and 1 and n is an integer of 1 to 2;
   e) a protective layer transparent to infrared radiation, made of an inorganic material.

2. The device according to claim 1, wherein said substrate is made of an electron-conducting material chosen from among materials having mechanical and chemical resistance to stresses of the external medium and chemically compatible with proton-operation.

3. The device according to claim 2, wherein said electron-conducting material is chosen from among metals.

4. The device according to claim 3, wherein said electron conducting material is chosen from among aluminum, platinum, chromium and the alloys thereof.

5. The device according to claim 2, wherein said electron-conducting material is chosen from among materials chemically compatible with the first proton storage electrochromic material.

6. The device according to claim 1, wherein said substrate is made of a non-electron-conducting material chosen from among materials having mechanical and chemical resistance to stresses of the external medium and chemically compatible with proton-operation.

7. The device according to claim 6, wherein said non-electron-conducting material is chosen from among materials chemically compatible with the first proton storage electrochromic material.

8. The device according to claim 6, wherein said non-electron-conducting material is chosen from among glasses and organic polymers having mechanical and chemical resistance.

9. The device according to claim 8, wherein the non-electro-conducting material is polyethylene terephthalate (PET).

10. The device according to claim 1, wherein the layer made of an electron-conducting material is made of an electron-conducting material chosen from among materials having mechanical and chemical resistance against stresses of the external medium, and chemically compatible with proton-operation.

11. The device according to claim 10, wherein said electron-conducting material is chosen from among metals and electron-conducting metal oxides.

12. The device according to claim 11, wherein said metals are aluminum, platinum, chromium, and alloys of aluminium, platinum and chromium, and said electron-conducting metal oxides are indium tin oxide and fluorine-doped tin oxide.

13. The device according to claim 10, wherein said electron-conducting material is chosen from among materials chemically compatible with the first proton storage electrochromic material.

14. The device according to claim 1, wherein the first proton storage electrochromic material is chosen from among proton storage electrochromic materials chemically compatible with proton-operation.

15. The device according to claim 14, wherein the first proton storage electrochromic material is chosen from among hydrated metal oxides, and mixtures of two or more of said oxides.

16. The device according to claim 15, wherein said hydrated metal oxides are amorphous.

17. The device according to claim 15, wherein the first proton storage electrochromic material is hydrated tungsten oxide $H_xWO_3.nH_2O$ where x is comprised between 0 and 1 and n is an integer of 1 to 2.

18. The device according to claim 14, where said first proton storage electrochromic material is chosen from among materials chemically compatible with the proton-conducting and electron-insulating electrolyte.

19. The device according to claim 1, wherein the proton-conducting and electron-insulating electrolyte is chosen from among proton-conducting and electron-insulating electrolytes chemically compatible with proton-operation.

20. The device according to claim 19, wherein the proton-conducting and electron-insulating electrolyte is chosen from hydrated metal oxides.

21. The device according to claim 20, wherein said hydrated metal oxides are amorphous.

22. The device according to claim 21, wherein said metal oxides are amorphous hydrated tantalum oxide $Ta_2O_5$, amorphous hydrated zirconium oxide and mixtures of two or more of said oxides.

23. The device according to claim 19, wherein the proton-conducting and electron-insulating electrolyte is chosen from among proton-conducting and electron-insulating electrolytes chemically compatible with/against crystallized tungsten oxide $H_xWO_3$-c (protonated tungsten oxide) or hydrated crystallized tungsten oxide $H_xWO_3.nH_2O$-c.

24. The device according to claim 1, wherein the protective layer transparent to infrared radiation is made of a material chosen from among materials chemically compatible with crystallized tungsten oxide $H_xWO_3$-c or hydrated crystallized tungsten oxide $H_xWO_3.nH_2O$-c.

25. The device according to claim 24, wherein the protective layer transparent to infrared radiation is made of a material chosen from cerium oxide $CeO_2$, yttrium oxide $Y_2O_3$, silica $SiO_2$ and mixtures of two or more of said metal or metalloid oxides.

26. The device according to claim 1, wherein the substrate has a thickness of 0.175 mm to 1 mm.

27. The device according to claim 1, wherein the layer made of an electron-conducting material coating the substrate made of a non-electron-conducting material has a thickness of 50 to 150 nm.

28. The device according to claim 1, wherein the layer of a first proton storage electrochromic material has a thickness of 0.2 to 1 µm.

29. The device according to claim 1, wherein the layer made of a proton-conducting and electron-insulating electrolyte has a thickness of 0.2 to 1 µm.

30. The device according to claim 1, wherein the layer made of tungsten oxide $WO_{3-y}$ has a thickness of 0.2 to 0.5 µm.

31. The device according to claim 1, wherein the layer of a second electrochromic material has a thickness of 0.2 to 1 µm.

32. The device according to claim 1, wherein the protective layer transparent to infrared radiation has a thickness of 0.1 to 1 µm.

33. A method for preparing the device according to claim 1, wherein the following successive steps are performed:
   a) a layer made of a first proton storage electrochromic material is deposited on a substrate made of an electron-conducting material, or on a layer made of an electron-conducting material arranged on a substrate made of a non-electron-conducting material, said substrate made of an electron-conducting material or said layer made of an electron-conducting material forming a first electrode;
   b) a layer of a proton-conducting and electron-insulating electrolyte is deposited on the layer made of a first proton storage electrochromic material;
   c) a layer of a non-electrochromic, sub-stoichiometric tungsten oxide $WO_{3-y}$, where y is comprised between 0.2 and 1, optically absorbent in the infrared, electron-conducting, porous, forming a second electrode, is deposited on the layer of a proton-conducting and electron-insulating electrolyte;
   d) a layer with variable infrared reflection of a second electrochromic material with variable proton intercalation rate chosen from among crystallized tungsten oxide $H_xWO_3$-c where x is comprised between 0 and 1 and hydrated crystallized tungsten oxide $H_xWO_3.nH_2O$-c where x is comprised between 0 and 1 and n is an integer of 1 to 2, is deposited on the layer of a non-electrochromic, sub-stoichiometric tungsten oxide $WO_{3-y}$;
   e) a protective layer transparent to infrared radiations, made of an inorganic material is deposited on the layer with variable infrared reflection of a second electrochromic material.

34. The method according to claim 33 wherein the layers are deposited using a physical vapour phase deposition method, PVD, chosen from among cathode sputtering, laser ablation and evaporation.

35. The method according to claim 34 wherein all the layers are deposited using one same physical vapour phase deposition method.

36. The method according to claim 35 wherein all the steps are conducted in one same vacuum chamber without opening the chamber between each of the steps.

37. The method according to claim 35, wherein said physical vapour phase deposition method is reactive magnetron cathode sputtering.

38. A bilayer consisting of a first layer of a non-electrochromic, sub-stoichiometric tungsten oxide $WO_{3-y}$, where y is comprised between 0.2 and 1, optically absorbent in the infrared, electron-conducting, porous, forming an electrode; and a second layer having variable infrared reflection of an electrochromic material with variable proton intercalation rate, chosen from among crystallized tungsten oxide $H_xWO_3$-c where x is comprised between 0 and 1, and hydrated crystallized tungsten oxide $H_xWO_3.nH_2O$-c where x is comprised between 0 and 1 and n is an integer of 1 to 2; said first tungsten oxide layer $WO_{3-y}$ being arranged adjacent to and underneath said second layer.

* * * * *